United States Patent [19]

Gitman

[11] Patent Number: 4,752,330

[45] Date of Patent: Jun. 21, 1988

[54] METHOD FOR MELTING AND REFINING METALS

[75] Inventor: Grigory M. Gitman, Duluth, Ga.

[73] Assignee: American Combustion, Inc., Norcross, Ga.

[21] Appl. No.: 933,149

[22] Filed: Nov. 21, 1986

[51] Int. Cl.⁴ .............................................. C21C 5/32
[52] U.S. Cl. .................................. 75/59.19; 75/59.23; 266/226
[58] Field of Search ...................... 75/59.19, 59.23, 43, 75/44 R, 44 S; 266/225, 226, 186, 187, 188, 189, 265, 266, 267

[56] References Cited

U.S. PATENT DOCUMENTS

| 4,023,781 | 5/1977 | Fritz et al. | 75/59.19 |
| 4,575,393 | 3/1986 | Bates et al. | 266/225 |

FOREIGN PATENT DOCUMENTS

| 8400176 | 1/1984 | PCT Int'l Appl. | 266/225 |
| 729270 | 4/1980 | U.S.S.R. | 266/265 |

Primary Examiner—Melvyn J. Andrews
Attorney, Agent, or Firm—Needle & Rosenberg

[57] ABSTRACT

This invention relates to a lance/burner apparatus and a method for melting and refining metals. Combustion produced from an oxy-fuel or fuel-air-oxygen flame is used to preheat and melt scrap. Oxygen is introduced through a lance pipe into the molten scrap to refine the metal.

6 Claims, 4 Drawing Sheets

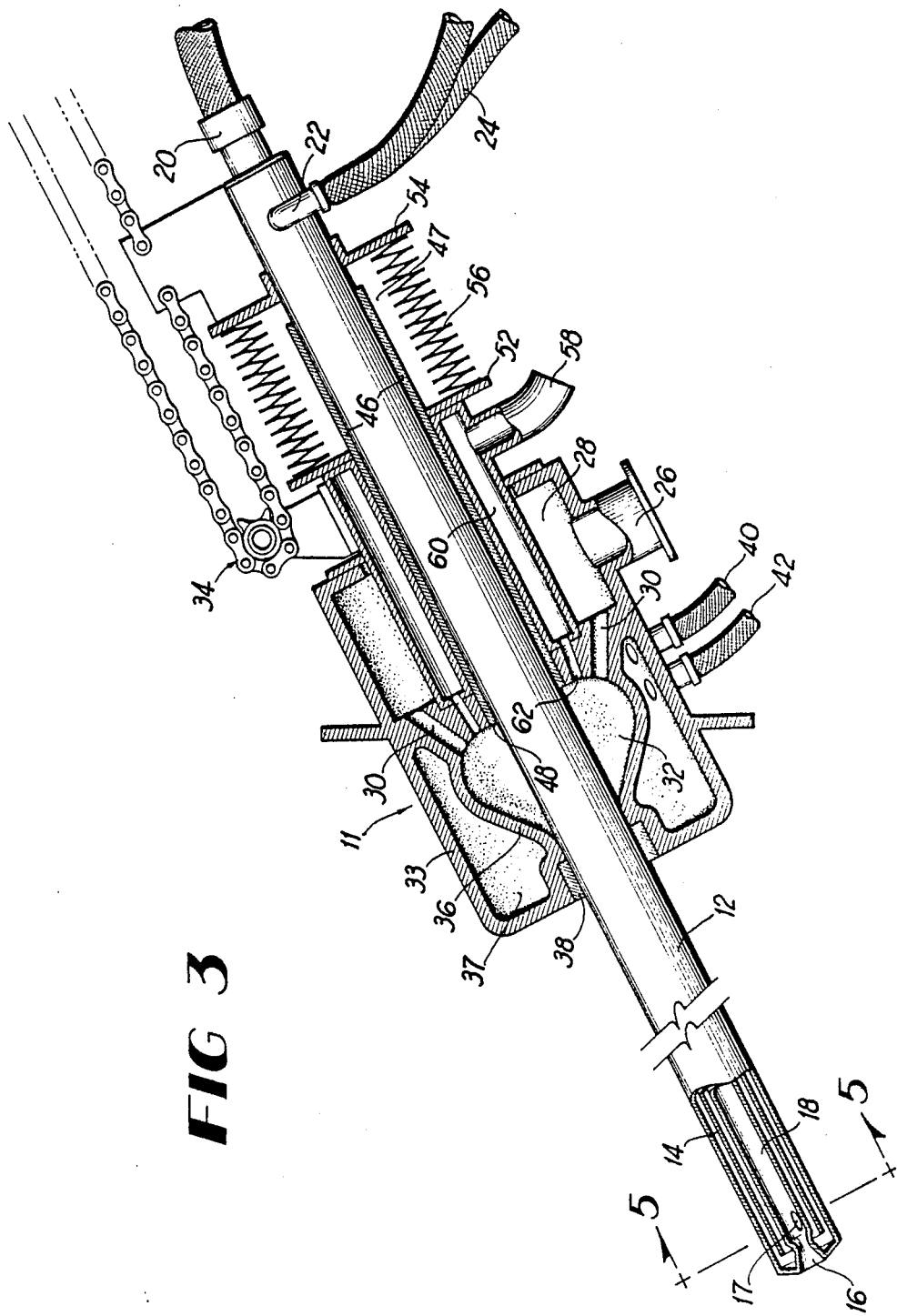

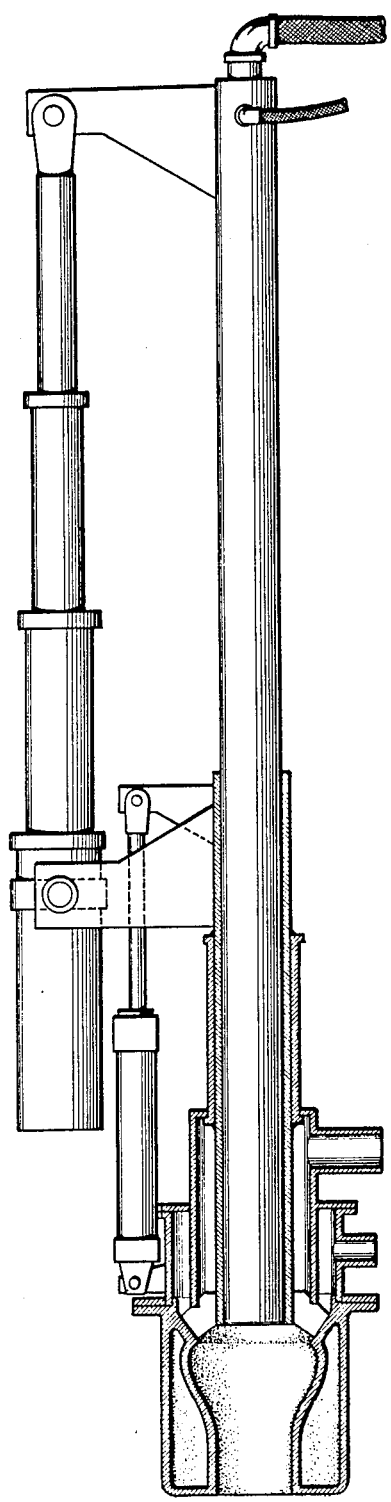
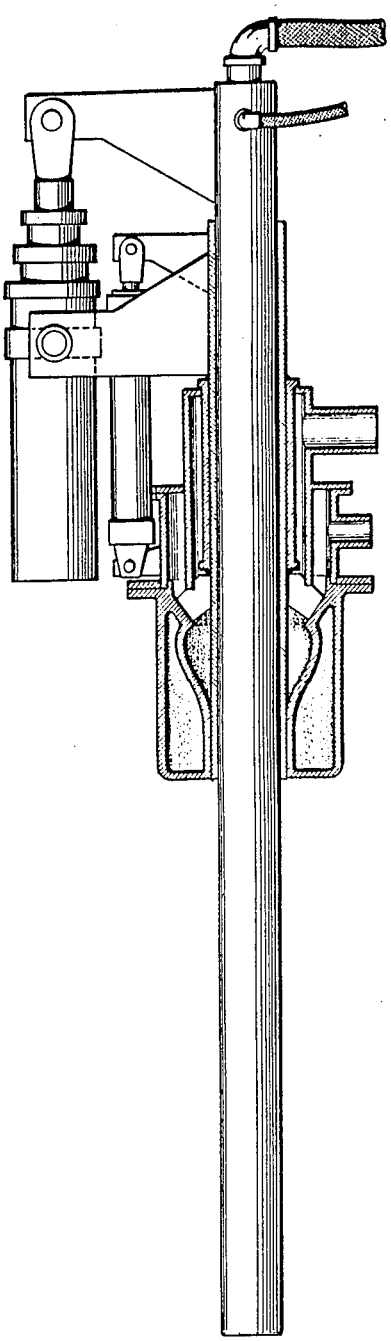
FIG 6
FIG 7

METHOD FOR MELTING AND REFINING METALS

BACKGROUND OF THE INVENTION

This invention relates to a method and apparatus for melting and refining metals, particularly steel. More particularly, it relates to a lance/burner means for preheating a quantity of metal, usually scrap, with an oxyfuel flame or a fuel/air/oxygen flame, and also for refining such metal by directing a high pressure oxygen stream toward the melt.

A known method of metallurgical processing, i.e. steel production, involves the injection of oxygen into the melt of charged materials, such as pig iron and scrap, for refining purposes. Presently, oxygen injection is accomplished by three distinct oxygen-lancing techniques.

One technique utilizes consummable lance pipes submerged at one end into the melt, and connected to an oxygen supply at the other end. A second technique, which utilizes a watercooled lance, involves a length of pipe surrounded by a watercooled jacket which is introduced into the furnace prior to the refining cycle and positioned to inject a high pressure oxygen stream into the melt by use of a specially designed nozzle. The third technique involves a watercooled oxygen lance/burner combination. In this method, a watercooled movable lance/burner produces a flame to melt scrap at the front of its nozzle during melting and provides a high-pressure oxygen stream from the same nozzle toward the molten bath during refining.

In the latter two watercooled lance and lance/burner techniques, the oxygen stream is directed toward the melt rather than submerged into the molten bath. Many oxygen lances use a Laval nozzle to provide the capability of penetrating the melt with oxygen at supersonic velocity, thereby increasing the interaction of oxygen and molten metal. Positioning the end of the lance at a distance of approximately one to two feet from the melt increases the penetration of the oxygen stream below the surface of the melt.

An advantage of the use of a watercooled lance/burner combination, rather than just a lance, is that it is capable of providing additional energy input by combustion of auxiliary fuel during melting, which is not possible with either the submerged pipe or the watercooled lance technique.

A disadvantage of using the watercooled lances and lance/burners described above is that it is necessary to completely remove them from the furnace and furnace shell after the lancing operation has been completed. This results in the need for keeping the lance-insertion opening in the furnace wall clean of slag and steel. For this reason the opening must be located a relatively long distance away from the top level of the molten metal. This in turn dictates that the lance pipe be of long length and also that a heavy structure be provided to support and move the lance in and out of the furnace. Also, the long length of the lance necessitates the increase of the diameter and surface area of the watercooled jacket, which in turn results in a corresponding excessive loss of heat and the consumption of cooling water. The long distance that the lance must travel through the furnace interior requires that the lance be positioned for insertion at the last possible moment when the scrap is almost completely melted and when the scrap pile will not interfere with the movement of the lance. This delays the refining cycle, thereby slowing down the steel-making process.

Lance/burner combinations in particular have severe maintenance problems during lancing due to plugging of the combustion tunnel and the fuel orifices of the lance/burner. The flow of fuel is shut down or reduced and the lance/burner nozzle is positioned close to the molten bath. Severe splashing of molten slag and metal during oxygen injection results from a rapid oxidation reaction between oxygen and molten metal components including, but not limited to, silicon, manganese, cromium, carbon and iron. The combustion tunnel and the fuel orifices experience plugging due to the splattering of steel and slag during refining which leads to the deterioration of the efficiency of the device as a burner.

There exists, therefore, a need for a lance which injects a high pressure oxygen stream into a melt and which permits the delivery of heat from the combustion of auxiliary fuel into scrap prior to refining. Also, there exists a need for such a lance which permits the early introduction of oxygen into the pool of melted material for refining purposes. A further need is for a lance of relatively small size so that its surface area and resultant loss of heat to the furnace, as well as its required cooling water pressure and consumption, is minimized. A still further need is for a lance which overcomes the problem of splashing steel and slag plugging its combustion tunnel and fuel orifices.

SUMMARY OF THE INVENTION

The present invention relates to a lance/burner combination for melting and refining metals, particularly steel. The apparatus contains a separately movable watercooled lance pipe, including a channel which delivers oxygen through an oxygen nozzle, a watercooled combustion chamber for combustion of fuel with oxygen, an oxygen supply system capable of delivering controlled amounts of oxygen to the lance/burner, a mechanism for moving the lance pipe into either a retracted or extended position, and a mechanism for removing solidified deposits of slag and steel from the surface of the movable lance pipe.

During the initial melting stage, the lance pipe serves as part of an oxy-fuel burner or fuel/air/oxygen burner and may be used to supply an oxygen stream for combustion. The products of combustion from this burner are used to preheat and melt the scrap.

After a substantial amount of the scrap pile located at the front of the burner combustion tunnel has been melted prior to the beginning of the refining stage, the lance pipe is advanced through the combustion chamber. Oxygen is forced through the lance pipe and exits through a nozzle, which can be arranged as a Laval-type nozzle at supersonic velocity. A Laval-type nozzle is a nozzle with a converging/diverging profile, which makes it possible to discharge oxygen with supersonic velocity. The supersonic velocity may be used to improve the penetration of the oxygen stream through molten slag into molten steel. The oxygen is injected into the molten metal, and exothermic oxidation reactions of steel refining occur. Upon completion of the refining stage, the lance pipe is retracted through the combustion chamber of the lance/burner to the area behind the combustion chamber.

The edge of the burner body may be used to remove solidified slag and steel from the lance pipe as it is withdrawn from the furnace. A hardened, sharpened edge on the pipe supporting the lance pipe also aids in removing slag and steel from the lance pipe as it is withdrawn from the furnace. A small protective fire may be provided after refining is completed and after the watercooled lance pipe has been retracted from the furnace environment to protect the lance/burner combustion chamber and nozzle from plugging with splashing molten metal and slag.

This invention also relates to a method of melting and refining metal by producing combustion from an oxy-fuel or fuel/air/oxygen flame directed toward the scrap to be melted. Fuel is introduced into a combustion chamber having an outlet burner nozzle directed toward the metal to be melted in the furnace interior. Oxygen is introduced at subsonic velocity into the combustion chamber through a lance pipe positioned behind the chamber so as to generate a flame which is discharged through the nozzle of the combustion chamber toward the metal. Once a substantial portion of the metal becomes molten, the fuel flow is stopped, the pressure of oxygen and resultant flow being delivered through the lance pipe is increased, and the lance pipe is advanced through the combustion chamber into the furnace interior. The lance pipe is moved through the hot furnace interior, maintaining a position above the molten bath of approximately 1.5-2.5 feet. Once the molten metal chemistry has reached the desired conditions, the oxygen stream is stopped and the lance pipe is retracted back into the area behind the combustion chamber. During such retraction, a portion of the burner body contacts the solidified slag and steel on the surface of the retractable lance pipe, thus removing it.

As a further step, a controllable amount of combustion air may be introduced into the combustion chamber so that a flame created by combustion of fuel, the combustion air, and oxygen is initially produced to melt the scrap charge.

It is an object of this invention to provide a lance/burner combination which permits the preheating of scrap with an oxy-fuel flame or a fuel/air/oxygen flame at an early stage of melting.

It is also an object of this invention to provide a lance/burner combination which permits the introduction of oxygen early in the melting/refining process.

It is a further object of this invention to provide a lance/burner combination which overcomes the problem of splashing steel and slag plugging its combustion tunnel and fuel orifices.

It is a still further object of this invention to provide a lance/burner combination which is of relatively small size so as to minimize surface area and heat loss.

BRIEF DESCRIPTION OF THE DRAWINGS

FIG. 3 shows a cross sectional view of the fuel-air-oxygen lance/burner in advanced lancing position.

FIG. 6 shows a cross sectional view of a lance burner having a movable supporting pipe and hydraulic advancing cylinders in a retracted burner firing position.

FIG. 7 shows a cross sectional view of a lance burner having a movable supporting pipe and hydraulic advancing cylinders in an advanced lancing position.

DESCRIPTION OF THE PREFERRED EMBODIMENT

The preferred embodiment is now described with reference to the drawings, in which like numbers indicate like parts throughout the views.

Figure 1:
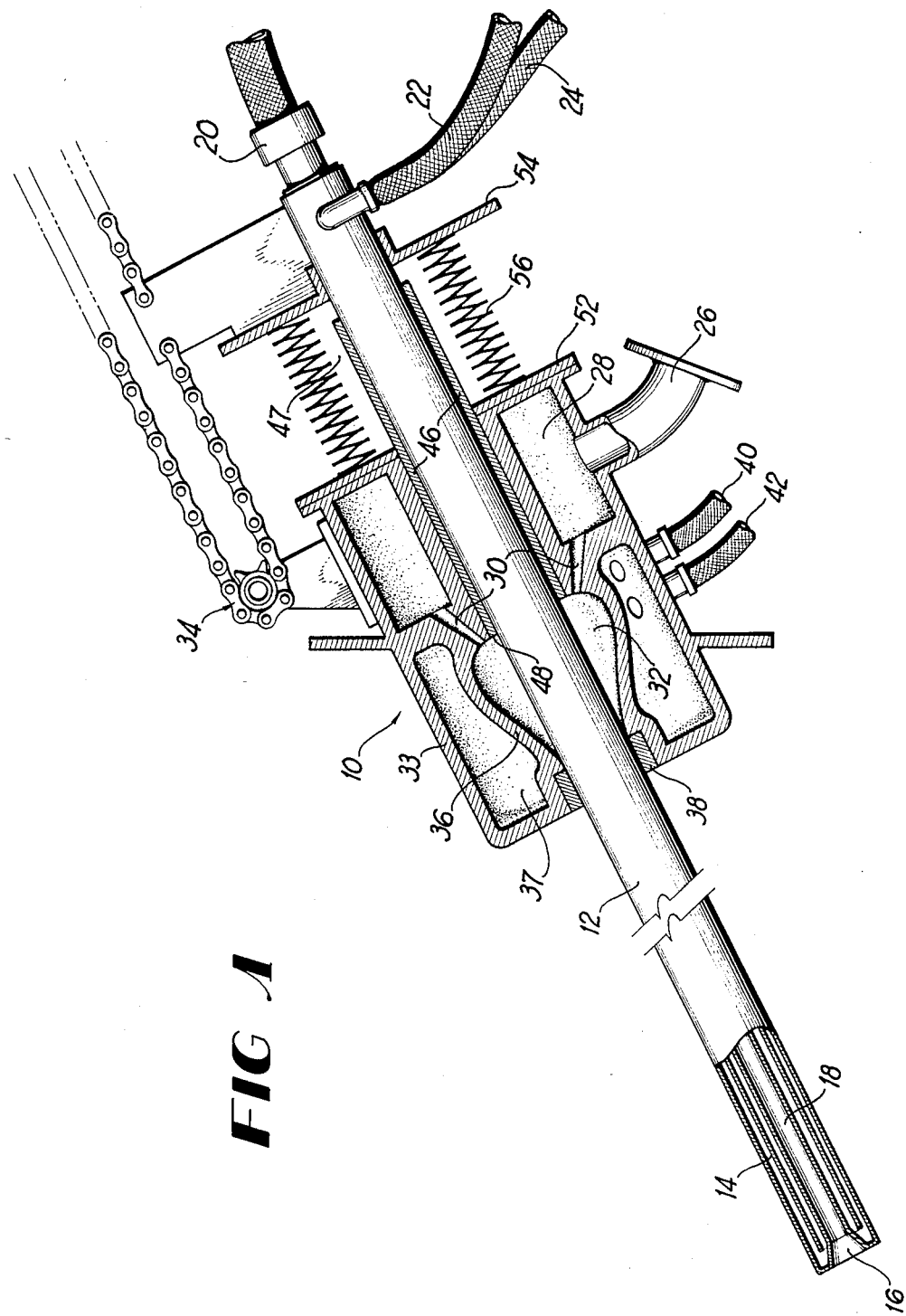
FIG. 1 shows a cross sectional view of the oxy-fuel lance/burner in advanced lancing position.

FIG. 1 shows an embodiment of the invention as an oxy-fuel lance/burner 10 in advanced lancing position, as appears during the refining stage. The lance/burner 10 includes a watercooled oxygen lance pipe 12 comprised of a watercooled jacket 14, an oxygen nozzle 16, preferably of a Laval type, an oxygen conduit 18 capable of delivering oxygen to the nozzle 16, an oxygen inlet 20 for delivering oxygen to the conduit 18, a cooling water inlet 22 for delivering water to the watercooled jacket 14, and a cooling water outlet 24 for removing water from the watercooled jacket 14.

Figure 2:
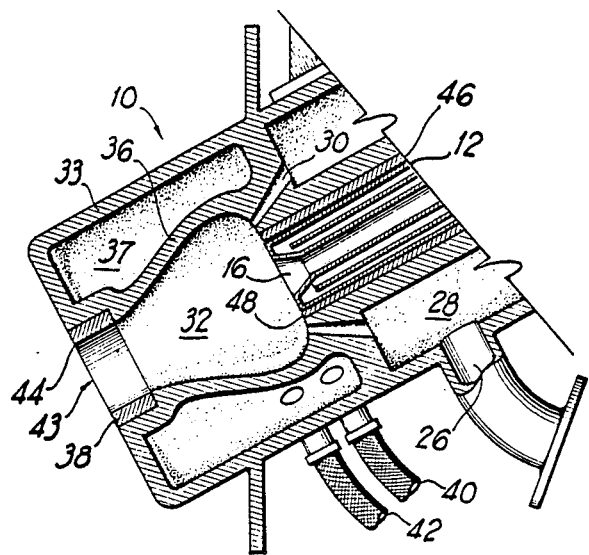
FIG. 2 shows a cross sectional view of the oxy-fuel lance/burner in retracted burner firing position.

When the lance/burner 10 is in operation as a fuel burning device during the initial stage of scrap melting, the watercooled lance pipe 12 is positioned as shown in FIG. 2, and supplies oxygen at subsonic velocity to a combustion chamber 32, located within a combustion block 33. The combustion chamber 32 has one open end. Fuel gas is delivered to a fuel inlet 26 and throughout the fuel chamber 28, then through a plurality of fuel channels 30, and into the combustion chamber 32. The combustion process then takes place therein, producing a flame used to melt the scrap. The metal, preferably copper, wall 36 of the combustion chamber 32 is cooled by water circulated outside the wall 36 and introduced through a water inlet 40 and evacuated through a water outlet 42.

After the scrap has been melted it becomes possible to move the lance pipe 12, as shown in FIG. 1, closer to the molten pool. A chain drive 34 connected to the rear extension of the lance pipe is used to move the lance pipe 12 toward the molten pool. At this time the fuel supplied to the inlet 26 is shut down and only the oxygen stream with higher, typically supersonic, velocity is directed toward the melt for refining purposes.

A metal cutting ring 38, positioned at the front nozzle 43 of the combustion chamber 32, has a hard and sharp edge 44 which allows it to scrape off slag and steel which has accumulated on the outside of the lance pipe 12 during refining as the lance pipe is being withdrawn back into the burner. A supporting pipe 46 is located through the burner body and supports the lance pipe 12, penetrates the fuel chamber 28 and is used to guide the lance pipe 12 into and out of the furnace interior. A hardened, sharp edge 48 on the end of the supporting pipe 46 closest to the combustion chamber 32 may also remove remaining slag and steel deposits from the lance pipe 12 as it is withdrawn. To eliminate any leakage between the lance pipe 12 and the supporting pipe 46, an expandable chamber 47 is arranged between a flange 52, which is welded to the supporting pipe 46, and a second flange 54 which is welded to the lance pipe 12. An expandable leak-proof conduit 56 is attached at one end to flange 52, and at the other end to flange 54 to form chamber 47.

Figure 4:
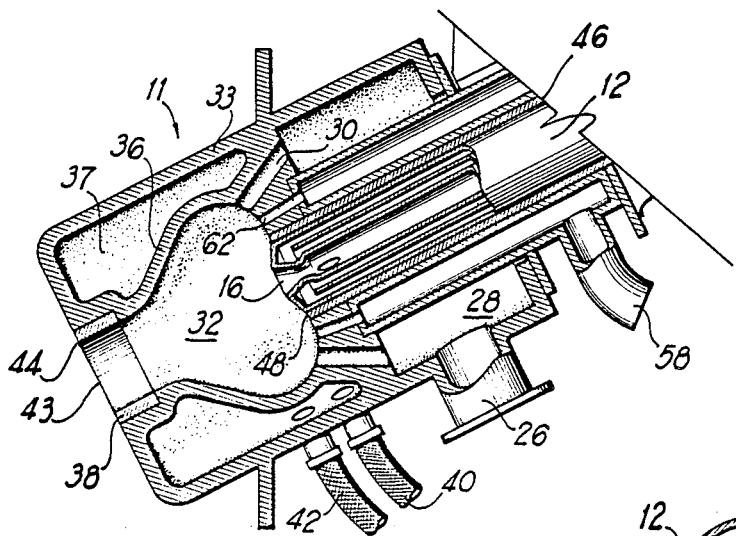
FIG. 4 shows a cross sectional view of the fuel-air-oxygen lance/burner in retracted firing position.
Figure 5:
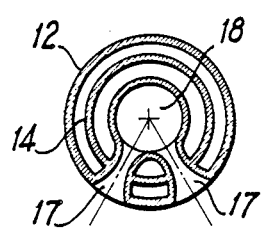
FIG. 5 shows a cross sectional view of the lance pipe having multiple oxygen nozzles.

FIGS. 3 and 4 show a second embodiment of this invention as a fuel/air/oxygen lance/burner. The watercooled oxygen lance/burner 11 includes an oxygen lance pipe 12 consisting of a watercooled jacket 14, an oxygen nozzle 16, preferably of a Laval type, and a conduit 18 for delivering oxygen to the nozzle 16. FIG. 5 shows the presence of additional oxygen nozzles 17 for further expelling oxygen from the conduit 18. These additional nozzles 17 should also preferably be of a Laval type so that the oxygen is introduced at supersonic velocity during the refining stage. These additional nozzles 17 are provided to increase the oxygen flow capacity and the area of molten metal being contacted by the oxygen stream, which reduces the duration of the refining cycle and increases overall productivity.

The oxygen conduit 18 delivers oxygen from the oxygen inlet 20 to the nozzles 16 and 17. Cooling water is supplied to the watercooled jacket 14 by a water inlet 22, and removed through outlet 24. Fuel is delivered through the fuel inlet 26 and throughout the fuel chamber 28, then through a plurality of fuel channels 30, and into the combustion chamber 32. Combustion air is delivered through the combustion air inlet 58 to the combustion air chamber 60, and then through a plurality of air channels 62 into the combustion chamber 32.

The cooling of the combustion chamber 32 and the removal of splashed steel and slag are both provided for as described above for FIGS. 1 and 2. The supporting pipe 46, the expandable chamber 47, the expandable conduit 56, and the chain drive mechanism 34 are also similar to those shown in FIGS. 1 and 2.

During the initial stage of scrap preheating, the lance pipe 12 is in a retracted position behind the combustion chamber 32. This allows oxygen to be delivered to the combustion chamber 32 at subsonic velocity. Simultaneously, fuel and combustion air are delivered to the combustion chamber 32 as described above. Combustion of the fuel with combustion air and oxygen is initiated in the combustion chamber 32, and the resulting flame is directed out the combustion chamber 32 through nozzle 43 toward the scrap being heated. As the scrap temperature rises, more oxygen and less combustion air is delivered through conduit 18 at subsonic velocity so as to reduce the amount of ballast nitrogen and to increase the temperature of the flame. Once the light scrap located close to the nozzle of the burner has been melted and the temperature of the heavy scrap has reached approximately 1800° F., the amount of fuel delivered to the combustion chamber is further reduced and a sufficient amount of excess oxygen may be introduced to cut heavy scrap as described in U.S. Pat. No. 4,622,077 and U.S. Patent number corresponding to application Ser. No. 755,831, notice of allowance of which has been received by applicant.

During this time, the lance pipe 12 remains in its retracted position so that any additional oxygen nozzles 17 are sufficiently close to supporting pipe 46 so that only a small amount of oxygen is bled between the supporting pipe 46 and the lance pipe 12 into the combustion chamber 32 and the expandable chamber 47. The total amount of oxygen delivered into the combustion chamber 32 during the entire firing time will typically be kept above stoichiometric to provide a sufficient oxidizer to combust oil and other combustible components present in the scrap.

Once the space beyond the nozzle 34 has become clear of scrap, the lance pipe 12 is moved by the chain drive 34 into the furnace interior and the refining stage is begun.

During this stage the supply of fuel and combustion air is stopped, and the pressure of the oxygen stream through conduit 18 is increased to provide higher oxygen velocities through the nozzles 17. When the lance pipe nozzles 16 and 17 are of a Laval type, oxygen leaving them will also be at higher oxygen velocities. The oxygen is then injected into the melt of charging materials to refine it.

Once the charging materials are sufficiently refined, the lance pipe 12 is retracted fully into the supporting pipe 46. During this retraction, any deposits of solidified scrap and steel which have accumulated onto the outer surface of the lance pipe 12 will be removed by the cutter ring 38 and the sharp edge 48 located on the end of the supporting pipe 46 closest to the combustion chamber 32.

After the lance pipe 12 has been fully retracted, a low flame is provided by the introduction of relatively small amounts of fuel, oxygen and air into the combustion chamber 32 to keep the combustion chamber 32 protected from slag and steel splashing during molten metal superheating.

FIGS. 6 and 7 show the invention wherein the supporting pipe 46 is capable of being extended to a position parallel to the front nozzle 43 of the combustion chamber 32 so that the cutting edge 48 of the pipe 46 is used as a primary means to remove solidified slag and steel deposits from the surface of the lance pipe 12. This eliminates the need for the metal cutting ring 38 shown in FIGS. 1 through 4, and enhances lance pipe 12 stability.

A first hydraulic advancing cylinder 63 may be used for extending and retracting the extendable supporting pipe 46. A first connecting plate 64 is attached to both the pipe 46 and the cylinder 63, so that the pipe 46 is retracted as the cylinder 63 is advanced, and so that the pipe 46 is extended when the cylinder 63 is receded. A second hydraulic advancing cylinder 65 may be used for extending and retracting the lance pipe 12, thereby eliminating the chain drive 34. A second connecting plate 66 is attached to both the lance pipe 12 and the cylinder 65, so that the pipe 12 is retracted as the cylinder 65 is advanced, and so that the pipe 12 is extended when the cylinder 65 is receded.

FIG. 6 shows the lance pipe 12 and the extendable supporting pipe 46 in a retracted position, as occurs when the lance/burner 10 is operating as the fuel burning device described above for FIGS. 2 and 4. FIG. 7 shows the lance pipe 12 and the extendable supporting pipe 46 in an advanced lancing position, as occurs during the refining stage as described above for FIGS. 1 and 3. When the lance is retracted, the supporting pipe 46 remains extended so that the slag and steel deposits removed from the surface of the lance pipe 12 fall into the furnace and not into the combustion chamber 32 of the lance/burner 10. The supporting pipe 46 can be retracted thereafter.

While the invention has been described in detail with particular reference to the preferred embodiment thereof, it will be understood that variations and modifications can be effected within the spirit and scope of the invention as previously described and as defined by the claims.

What is claimed is:

1. A method of melting and refining metal, comprising the steps of:
    delivering fuel into a combustion block having a water cooled combustion chamber which opens at one end of said combustion block for combustion of fuel and oxygen, delivering oxygen through an extendable watercooled lance pipe in retracted position to said combustion chamber so as to combust with fuel for generating a flame for melting metal, and directing the flame through a nozzle located at one end of said combustion chamber toward the metal for sufficient period of time to allow the metal to become molten;

then stopping said delivery of fuel once the metal is substantially molten;

then extending said lance pipe through said combustion chamber and toward the molten metal;

then delivering oxygen at high pressure through said lance pipe so that the oxygen is directed into the molten metal until the molten metal has reached a desired degree of refining; and then retracting said lance pipe to a position behind said combustion chamber.

2. The method as claimed in claim 1, further comprising the step of also delivering combustion air into said combustion chamber while said lance pipe is in a retracted position so that said combustion air together with the delivered fuel and oxygen participates in generating a flame for melting metal.

3. The method as claimed in claim 1 or 2 wherein the molten metal includes slag which may form deposits on an outer surface of said lance, further comprising the step of removing any slag deposits from the outer surface of said lance pipe by means for scraping said lance pipe as said pipe retracts.

4. The method as claimed in claim 1, wherein the oxygen is delivered at supersonic velocity to the molten metal from said lance pipe during refining.

5. The method as claimed in claim 4, wherein the oxygen is delivered at supersonic velocity from said lance pipe in a plurality of streams directed at different angles toward the molten metal, increasing oxygen/metal contact.

6. The method as claimed in claim 1, wherein said lance pipe maintains a position less than 3 feet above the molten metal as it delivers oxygen to the molten metal.

* * * * *